United States Patent [19]

Laughlin et al.

[11] 4,382,082
[45] May 3, 1983

[54] RECOVERY OF COBALT VALUES BY ABSORPTION FROM AMMONIACAL SOLUTION

[75] Inventors: William C. Laughlin, Schaumburg, Ill.; William K. Tolley, Salt Lake City, Utah

[73] Assignee: UOP Inc., Des Plaines, Ill.

[21] Appl. No.: 333,245

[22] Filed: Dec. 21, 1981

Related U.S. Application Data

[63] Continuation-in-part of Ser. No. 217,974, Dec. 18, 1980, abandoned, which is a continuation-in-part of Ser. No. 90,220, Nov. 1, 1979, abandoned.

[51] Int. Cl.³ .............................................. C01G 51/00
[52] U.S. Cl. .................................................... 423/150
[58] Field of Search .......... 423/25, 32, 150, DIG. 14; 75/101 BE, 119; 210/32, 38

[56] References Cited

U.S. PATENT DOCUMENTS

| | | | |
|---|---|---|---|
| 3,661,564 | 5/1972 | Gandon | 75/101 R |
| 3,772,423 | 11/1973 | Stevens | 423/150 |
| 3,772,424 | 11/1973 | Stevens | 423/144 |
| 3,845,189 | 10/1974 | Miller | 423/150 |
| 3,948,769 | 4/1976 | Dobbs | 210/32 |
| 4,187,281 | 2/1980 | Stauter | 423/150 |

FOREIGN PATENT DOCUMENTS

1355535  6/1974  United Kingdom ................. 423/25

OTHER PUBLICATIONS

Helfferich, *Ion Exchange*, McGraw-Hill Book Co., (1962) pp. 17, 18.

*Primary Examiner*—Brian E. Hearn
*Attorney, Agent, or Firm*—James R. Hoatson, Jr.; Raymond H. Nelson; William H. Page, II

[57] ABSTRACT

The recovery of metal values such as cobalt may be improved in a hydrometallurgical recovery of metal values from metal-bearing sources such as ores and the like. The hydrometallurgical recovery process involves subjecting a metal-bearing source to a reductive roast in a reducing atmosphere after having treated said source with at least one additive. Thereafter, the reduced metal-bearing source is cooled and extracted by a leaching operation such as treatment with an ammoniacal ammonium salt solution. The leaching step is followed by a separation of various metal values by adding a solid adsorbent to the leach solution whereby selective metal ions are adsorbed thereon. The improvement of the process involves subjecting the solid adsorbent to a stripping operation with a stripping agent such as steam or a gas at an elevated temperature prior to recovery of the adsorbed metal ions from the solid adsorbent by conventional means such as acid-stripping.

10 Claims, 1 Drawing Figure

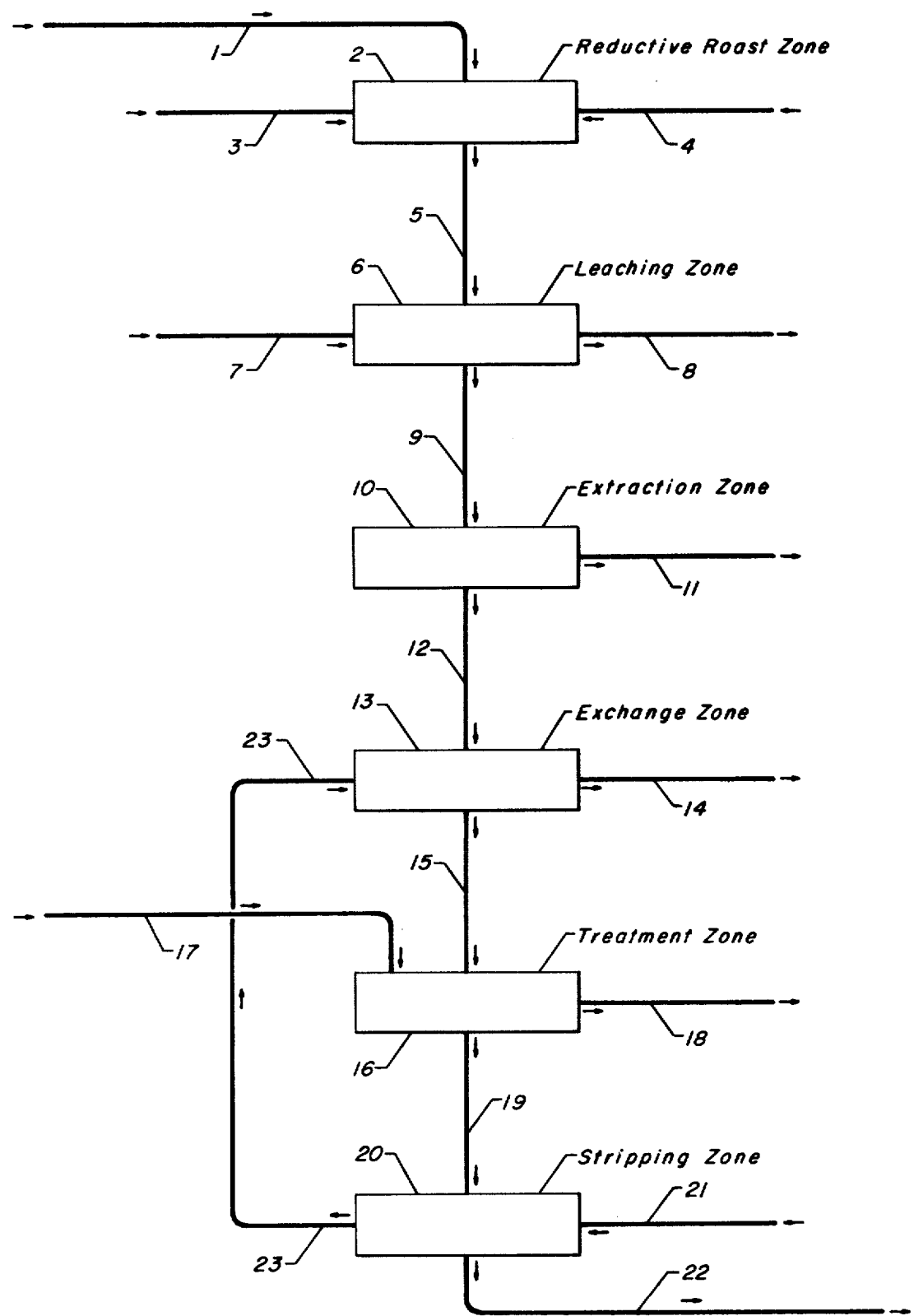

RECOVERY OF COBALT VALUES BY ABSORPTION FROM AMMONIACAL SOLUTION

CROSS-REFERENCE TO RELATED APPLICATIONS

This application is a continuation-in-part of our co-pending application Ser. No. 219,974 filed Dec. 18, 1980 and now abandoned which is a continuation-in-part of application Ser. No. 90,220 filed Nov. 1, 1979 and now abandoned, all teachings of which are incorporated herein by reference thereto.

BACKGROUND OF THE INVENTION

In the processing of materials containing metal values, two of the main extractive methods to be considered are pyrometallurgy and hydrometallurgy. In the former, a metal-containing material such as ore, slag, scrap, etc., is heated with appropriate agents such as reducing agents, fluxing agents, sulfidizing agents, chloridizing agents and/or oxidizing agents, etc., usually the melting or fusion point of the mixture. At this temperature, there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 1000° C. to 2000° C. An advantage in this method is that recoveries of the metal values are typically quite high.

The hydrometallurgy approach differs substantially from pyrometallurgy in that, although the metal-bearing material such as ore, slag, scrap, etc., may be heated with agents such as reducing agents, oxidizing agents, sulfidizing and chloridizing agents as part of the procedure, the temperatures involved are generally much lower than with the usual pyrometallurgical method. These temperatures typically may be 260° to about 1040° C., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a limonite ore or a highly serpentinic ore, such as that at Nicaro, Cuba, involves roasting the ore in a multiple hearth furnace while a reducing gas such as producer gas passes countercurrent to the ore. Temperatures in this case range from about 485° to about 735° C. Following the roasting step, the ore is cooled in the absence of air, mixed with an ammoniacal ammonium carbonate solution and vigorously agitated and aerated. This results in the dissolution of nickel, copper and cobalt, separating them from the bulk of the ore. This solution then is treated with steam, driving off ammonia and precipitating nickel carbonate. This product then is treated further to obtain the appropriate form of nickel or use as such. In comparison to the pyrometallurgical process, however, extractions using this method have only been of the order of 70 to 80 percent.

Several United States Patents have disclosed processes such as that hereinbefore described. Among these patents are U.S. Pat. Nos. 3,845,189, 3,772,423, 3,772,424 and 3,661,564. These patents describe a hydrometallurgical method utilizing additives comprising aqueous solutions of hydrogen chloride, hydrogen bromide, gaseous sulfur compounds such as hydrogen sulfide, sulfur dioxide, etc., as well as elemental sulfur which are utilized to treat the metal-bearing source.

Several other hydrometallurgy methods involve the use of procedures which include a roasting step with chlorides or sulfates, but in other than reducing atmospheres and in such a manner as to form soluble metal salts, and the roasted ore is leached with an appropriate solvent such as dilute sulfuric acid. Alternatively, in certain cases the ore can be leached directly, such as with sulfuric acid solution, but this is practical only when the magnesia content of the ore is low.

It has now become increasingly important to recover all of the various metals which are present in metal-bearing sources such as ores. Although the above set forth patents are concerned primarily with the recovery of nickel, it has become increasingly important that metals such as cobalt be recovered from metal-bearing sources such as lateritic ores due to the fact that the use of cobalt is becoming more important in the chemical industry as well as other industries such as metal fabrication, ceramics, etc. The principal use of cobalt is in alloys, especially cobalt steels where it is used for permanent supermagnets as well as cobalt-chromium high speed tool steels. In addition, cobalt alloys are also used where high temperatures are present such as in jet engines.

British Patent Specification No. 1,355,535 discloses a method for the extraction of metals from solution. In this patent, ammonia or a derivative thereof is added for the purpose of forming a soluble amine or amine-type complex to a solution of metal. The ammonia is added to the metal solution in an amount at least sufficient to satisfy the stoichiometric requirements for the formation and stabilization of the amine complex.

Alternatively, the solid adsorbent, which is utilized to adsorb the metal, may be impregnated with the ammonia or ammonia derivative. However, after adsorbing the metal on the solid adsorbent, the latter is then subjected to destruction by means of an oxidation step followed by additional steps important to recover the metal.

Another patent, namely U.S. Pat. No. 3,948,769, discloses a process for removing ammonia from solutions of waste water. However, this patent does not relate to the art of recovering metal values such as cobalt in a cobalt recovery process, but teaches merely the regeneration of an exchange medium such as a synthetic resin containing an ammonia complex by contacting the medium with low pressure steam, hot water, or hot air.

As will hereinafter be set forth in greater detail, it has now been discovered that metals, and particularly cobalt, may be recovered in greater yields during the hydrometallurgical recovery of other metals, such as nickel, by utilizing solid adsorbents which have been subjected to a pretreatment step prior to their use as adsorbents.

SUMMARY OF THE INVENTION

This invention relates to an improvement in the process for the extraction of metal values from metal-bearing sources. More specifically, the invention is concerned with an improvement in a hydrometallurgical process for the recovery of metal values from metal-bearing sources in which the source is heated in a reducing atmosphere. After having been subjected to treatment with at least one additive, said additives enhance the effectiveness of the reductive roast whereby the recovery of the desired metal values is improved.

As hereinbefore set forth, improved recovery of metal values is obtained when the roasting of the metal-containing material such as ore, slag, scrap, etc., is effected in contact with additives such as gaseous sulfur compounds, added solid sulfur and/or added halides whereby the recovery of the metal value is effected in a considerably higher yield than heretofore obtained in the hydrometallurgical system.

The process of the present invention may be used for the recovery of metal values from ore, slag, scrap or other metal-bearing sources. Examples of metal values which may be recovered in improved yields will include nickel, cobalt, copper, manganese, or other metals which are soluble in ammoniacal solutions but not necessarily with equivalent results.

As another advantage to the present invention, the process may be conducted in conventional apparatus and may utilize much of the conventional steps of processes heretofore used. Accordingly, the metal-bearing source such as an ore, one example of said ore being a lateritic nickel ore, is prepared in a manner suitable for the process such as finely divided or comminuted particles in a conventional way. The particles may be within a size range of from about 4 mesh to about 500 mesh or smaller and preferably within a range of from about 48 mesh to about 200 mesh. The particles then preferably are dried in a conventional manner to lower the moisture content of from about the usual 25% to 50% down to about 3% to 10% or less. The drying generally is effected in a rotary kiln at conventional temperatures.

The added sulfur compound will be used in a sufficient concentration for the purpose and may be within the range of from about 0.01% to about 10% and preferably from about 0.1% to about 5% by weight of the ore. Any suitable gaseous sulfur compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the added sulfur compound preferably is normally in gaseous form. In addition, the solid sulfur may, if so desired, be in solid forms including powder, flour, granules, pellets, etc. Generally speaking, the sulfur is employed in a concentration of from about 0.01% to about 5% and preferably from about 0.15% to about 3% by weight of the ore.

When the additive comprises a hydrogen halide, the hydrogen halide is used in a concentration of from about 0.01% to about 10%, and preferably from about 0.1% to about 5% by weight of the ore. Any hydrogen halide gas may be used, and preferably comprises hydrogen chloride or hydrogen bromide, although it is also contemplated within the scope of this invention that hydrogen iodide or hydrogen fluoride may also be employed, but not necessarily with equivalent results. In still another embodiment, a precursor of hydrogen halide may be used and may be selected from free halogen, chlorine, bromine, iodine, fluorine or other suitable compounds selected from metal halides, boron halides, carbon halides, phosphorous halides, silicon halides, etc.

In the preferred embodiment, the additives are in gaseous form in order to utilize a dry system for the hydrometallurgical recovery of the metal values. The use of a dry system possesses several advantages over a wet system. For example, a wet system will utilize more costly or expensive equipment and, in addition, will also entail higher operating costs such as that required for fuel. In a wet system, a sufficient amount of heat must be added to remove any moisture which is present in the system. A dry system is non-corrosive in nature as opposed to a potential corrosion problem which may arise when employing wet acids as additives for the process. Other advantages which are found when employing a dry system in the process entails the potential which is present to recover a higher percentage of additives for reuse than is possible when employing a wet system. In addition, another potential which exists is the higher recovery of metal values due to a higher extraction of the desired metal from the metal-bearing source.

It is therefore an object of this invention to provide an improved process for the recovery of metal values from a metal-bearing source.

A further object of this invention is found in an improvement in a process for effecting the recovery of metal values from a metal-bearing source by subjecting a solid adsorbent which is utilized to selectively adsorb metal ions thereon to a stripping operation prior to the removal and recovery of said metal ions.

In one aspect, an embodiment of this invention resides in a process for the recovery of cobalt values from a cobalt-bearing source which comprises treating said source with at least one additive, reductively roasting said source at an elevated temperature, leaching the resultant reduced source with an ammoniacal ammonium salt solution, adsorbing dissolved cobalt ions on a solid carbonaceous adsorbent and recovering the adsorbed cobalt ions, the improvement which comprises treating said solid adsorbent with a stripping agent at an elevated temperature prior to recovery of said cobalt ions.

A specific embodiment of this invention is found in a process for the recovery of metal values from a metal-bearing source which comprises subjecting a metal-bearing source such as a lateritic ore to a reductive roast in an appropriate reducing atmosphere at a temperature in the range of from about 500° to about 1000° C. in contact with hydrogen chloride, cooling the reduced metal-bearing source, extracting the cooled source with an ammoniacal ammonium carbonate solution, optionally removing nickel and copper, adding thereto lignite to adsorb cobalt ions on said lignite, separating said lignite from the leach solution, treating said lignite with steam at a temperature in the range of from about 75° to about 150° C., and recovering the desired cobalt ions from said lignite.

Other objects and embodiments will be found in the following further detailed description of the present invention.

DESCRIPTION OF THE INVENTION

As hereinbefore set forth, the present invention is concerned with an improvement in the recovery of certain metal values from a metal-bearing source, for example, lateritic ores containing a mixture of metal values including nickel, cobalt, iron, magnesium, silica, etc. When subjecting this type of metal-bearing source to a recovery process, it is important that both nickel and cobalt be recovered in economically attractive yields. One hydrometallurigcal process for the recovery of these metals, the details of which will be hereinafter set forth, includes steps of recovering cobalt by adsorbing cobalt ions on a solid carbonaceous adsorbent such as coal, carbon, lignite, peat, etc. After adsorbing these cobalt ions on the solid adsorbent, the adsorbent is treated to recover the aforesaid cobalt. One method of recovering the cobalt is to wash the solid adsorbent and thereafter acid-stripping said adsorbent with an acid solution such as dilute sulfuric acid following which the acid is subjected to an electrowinning process for recovery of the metal from the acid solution. However, this method of cobalt recovery has the disadvantage of a low recovery percentage of the metal from the adsorbent plus the accumulation in the stripping solution of ammonium ions which are present on the solid adsorbent. The metal amine complexes that are adsorbed onto the carbonaceous adsorbents are not completely stripped from the adsorbent by the sulfuric acid. As hereinbefore set forth, the accumulation of ammonium ions which are extracted into the acid solution constitute a detriment to the electrowinning step. Therefore, the acid stripping of the adsorbent to recover the adsorbed cobalt is insufficient to recover all of the cobalt which consequently results in a loss of the metal and a decreased capacity of the adsorbent equipment.

As will hereinafter be shown in greater detail, it has now been discovered that this problem of insufficient cobalt recovery may be overcome by subjecting the solid adsorbent to a stripping procedure prior to acid treating the solid carbonaceous adsorbent to recover cobalt. The stripping operation of the solid carbonaceous adsorbent is accomplished by treating the solid adsorbent after contact with a solution of cobalt with a stripping agent such as steam, hot water, or hot gas such as nitrogen, carbon dioxide, hydrogen, argon, helium, etc. The stripping operation of the solid carbonaceous adsorbent which contains adsorbed cobalt ions with a stripping agent will convert the metal amine complex which has been formed during the leaching operation in which the cobalt has been leached with an ammoniacal ammonium salt into a hydrated metal ion. Thereafter, the hydrated cobalt ion will be completely stripped from the carbonaceous adsorbent by the acid solution such as dilute sulfuric acid and thus permit a substantially greater recovery of the desired cobalt ion than has heretofore been found possible.

There are several advantages which are attendant to the stripping of the cobalt-loaded carbonaceous solid adsorbent prior to subjecting the loaded solid adsorbent to said stripping step in the process. One distinctive advantage is that a lesser amount of an acid such as sulfuric acid is consumed by the by-product stripping, thus effecting an economical advantage by the utilization of less acid. In addition, the removal of the ammonium ions according to the following reaction

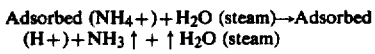

by ammonia which is recovered by this reaction is then available for recycling to the ammoniacal leaching step of the process. Likewise, the conversion of cobaltic amine complexes to hydrated cobalt (II) ions according to the following reaction.

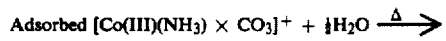

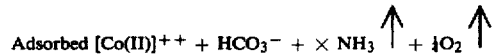

will enable the ammonia and carbon dioxide to also be recycled to the leaching step of the process. Furthermore, the hydrated cobalt (II) ions are efficiently stripped in a subsequent acid stripping step as highly soluble cobalt salts such as cobalt sulfate. This is in contrast to the acid stripping of the amine complex without conversion to the hydrated ions which yield a relatively insoluble double salt of ammonium sulfate and cobalt sulfate. The presence of this relatively insoluble double salt has a negative impact in the recovery of cobalt inasmuch as the aforesaid double salt causes a relatively great degree of difficulty during the subsequent electrowinning of the cobalt.

The treatment of the solid adsorbent with a stripping agent such as steam, water or a gas will be effected at an elevated temperature in the range of from about 75° to about 150° C. and preferably in a range of from about 90° to about 150° C.

The hydrometallurgical process for the recovery of metal values is effected by subjecting a feedstock which may comprise an ore such as a laterite ore to a grinding or crushing step in which the feedstock is ground to the desired particle size, said grinding means including a ball mill or any other type of crushing or grinding apparatus which is known in the art. In one embodiment, the feedstock may then be treated with at least one additive selected from the group consisting of hydrogen halides, elemental sulfur, sulfur-containing compounds and mixtures thereof. The sulfur-containing compound which may be a gaseous sulfur compound such as sulfur dioxide or hydrogen sulfide is used within a sufficient concentration for the purpose and may be within the range of from about 0.01% to about 10% and preferably from about 0.1% to about 5% by weight of the feedstock. For ease of use, the sulfur-containing compound is preferably in gaseous form. However, in another embodiment, it may be normally liquid and vaporized prior to use or allowed to vaporize under the conditions existing in the reducing zone. The sulfur-containing compound may be a hydrocarbon sulfide including, for example, methyl mercaptan, ethyl mercaptan, propyl mercaptan, butyl mercaptan, pentyl mercaptan, hexyl mercaptan, etc., but generally containing not more than about 20 carbon atoms per molecule. In addition, another additive comprises elemental sulfur. When this additive is employed, the elemental sulfur may be in solid form such as powder, flour, granules, pellets, etc., or as molten or otherwise liquefied sulfur or as sulfur vapors. The elemental sulfur generally is employed in a concentration of from about 0.01% to about 5% and preferably from about 0.15% to about 3% by weight of the ore. If so desired, the gaseous sulfur compound or elemental sulfur may be used in combination with added hydrogen halide. As in the case of the sulfur-containing compound, the hydrogen halide is used in a concentration of from about 0.01% to about 10% and preferably from about 0.1% to about 5% by weight of the ore. Any hydrogen halide gas may be used and preferably comprises hydrogen chloride or hydrogen bromide, although hydrogen halide or hydrogen fluoride may be employed, but not necessarily with equivalent results. If so desired, a precursor of hydrogen halide may be utilized and may be selected from free halogens, namely, chlorine, bromine, iodine, or fluorine, or suitable compounds selected from boron halides, carbon halides, phosphorous halides, silicon halides, etc.; or in still another embodiment, the hydrogen halide precursor may comprise a hydrocarbon halide which preferably contains not more than about 20 carbon atoms per molecule. The sulfur compounds and added hydrogen halide may be introduced separately into the reducing zone or they may be supplied in admixture thereto. In one method, the reducing gases are bubbled through a suitable hydrogen halide solution, then gaseous sulfur dioxide, hydrogen sulfide or other gaseous sulfur compound added thereto and the reducing gases containing both of the additives are charged to the reducing zone. It is to be understood that any suitable method of introducing these components may be employed, and will be selected to suit the arrangement of the particular system being utilized. When utilizing elemental sulfur, the sulfur may be admixed with the feedstock at an elevated temperature which preferably is within the range of from about 260° to about 450° C. and conveniently is accomplished by mixing the sulfur at the elevated temperatures of the particles being withdrawn from a drying step to which the feedstock is subjected at a point subsequent to being ground to the desired particle size and prior to being subjected to the reductive roast.

Thereafter, the feedstock is then subjected to a reductive roast, the chemical reduction of the ore being effected by means of an appropriate reducing atmosphere which is of the general type used in conventional processes. Any suitable appropriate reducing gas mixture may be used, and preferably comprises a mixture of hydrogen, carbon monoxide, carbon dioxide, and water vapor. The gas mixture may come from any suitable source including producer gas, gases formed by the combustion of city gas, gases formed by the combustion of oil, coal, etc., the specific gas mixture being selected to effect the desired reduction. An illustrative gas mixture comprises a $CO:CO_2$ ratio within the range of about 0.1:1 to 10:1, a $CO:H_2$ ratio of about 0.1:1 to 10:1 and a $H_2:H_2O$ vapor ratio of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas or a gas such as carbon monoxide may be employed.

The reduction of the metal compounds to the free metal is effected at a temperature in the range of from about 500° to about 1000° C. and preferably in a range of from about 650° to about 900° C. This temperature which is utilized in the reduction avoids the objections inherently present in the prior art high temperature reduction processes and at the same time is sufficiently high to decompose any soluble metal salts such as metal chlorides present. Also, the reduction is effected in a relatively short period of time and thus further constitutes another advantage to the novel method of the present invention.

In another embodiment of the process, as an alternative method of effecting the addition of additives to the feedstock, the off-gases which are withdrawn from the reducing zone and which contain the additives in the form of halides, halogens, sulfur dioxide or hydrogen sulfide are passed through a scrubbing zone wherein they are scrubbed by contact with a scrubbing material which comprises fresh feedstock, said fresh feedstock being ground metal-bearing source. The off-gas is scrubbed in a dry manner at temperatures ranging from about 100° to about 500° C. and preferably in a range of from about 150° to about 400° C. The mixture of fresh feedstock and off-gases after scrubbing thereof are passed to a dust collector wherein the clean off-gases which contain no additives, the additives having been adsorbed or entrained on the feedstock, are separated. The fresh feedstock which contains the volatile additives on the feed or by the reaction of chloridization, adsorption, condensation, neutralization, etc., is also withdrawn from the dust collector and passed to the reducing zone. If so desired, an additional portion of fresh feedstock may be admixed with the treated feedstock prior to admission to the reducing zone and the combined total is then charged to the reducing zone for reaction at the aforesaid temperature of from 600° to 1000° C. in a reducing atmosphere.

The reduced ore particles are withdrawn from the reducing zone and thereafter processed in a conventional manner for the hydrometallurgical extraction of the desired metal values. For example, the effluent from the reduction zone is first cooled several hundred degrees and then is passed into one or more quench zones. In a preferred embodiment, the quench liquid is the ammonium carbonate leaching solution. However, the quenching must be effected in the absence of air. In other words, oxygen or air should not contact the reduced particles until the temperature of the particles is below about 95° C. because of the possibility of oxidation of the metal to the oxide or to other oxygen-containing compounds. It is understood that other suitable quenching solutions may be employed but, as hereinbefore set forth, economical advantages appear for the use of the leaching solution.

Any suitable leaching solution may be employed and preferably comprises aqueous ammonium carbonate solution containing from about 2% to about 25% and preferably from about 3% to about 15% $NH_3$ and from about 1% to about 15% and preferably from about 1.5% to about 10% $CO_2$. As still another advantage to the process of the present invention, the leaching solution comprises a lower concentration of $NH_3$ than generally is utilized in the prior art, thus effecting an additional economy in the present process. The leaching is effected at a temperature below 95° C. and conveniently ambient temperature. Ambient pressure or superatmospheric pressure may be used but generally will not exceed about 100 psig. As hereinbefore set forth, the leaching is effected in the presence of oxygen, which may comprise ambient air when the leaching is effected in open tanks or vessels or it may comprise air introduced into closed zones. It is understood that, in the place of air, oxygen or other suitable oxygen-containing source may be utilized.

The solution which is withdrawn from the leaching and thickening zones is then treated in any suitable manner to separate various metal values. For example, when recovering nickel, one method is to steam the solution whereby nickel carbonate is precipitated and the ammonia, carbon dioxide and water are volatilized. Following this, the precipitated nickel carbonate can be treated in any conventional manner to recover the desired metal. In another embodiment, the leach solution is subjected to a solvent extraction step utilizing organic solvents such as oximes, specific examples of these solvents being LIX-64 sold by the Henkel Company, Kelex sold by the Ashland Oil Company and Shell Extractant-529 sold by the Shell Oil Company. In this extraction, the nickel and copper will be separated from cobalt which, due to the fact that the cobalt is in liquid phase in a valence state of $+3$ will not be extracted.

The aqueous liquid containing the dissolved cobalt will then be passed to an exchange step. In this exchange step the liquid is contacted with a solid adsorbent such as carbon, coal, lignite, peat, etc., which may be in granular or powder form. The contact of the aqueous solution of the metal value such as, for example, cobalt, with the solid adsorbent will take place, in the preferred embodiment of the invention, at ambient temperature and atmospheric pressure for a period of time which may range from about 0.1 up to about 4 hours or more in duration. Following the contact, the solid adsorbent which contains the desired metal value adsorbed thereon is treated at an elevated temperature in the range of from about 75° to about 150° C. with a stripping agent. As hereinbefore set forth, this stripping agent may comprise steam, hot water, hot gases of the type hereinbefore set forth, the particular form of stripping agent being dependent upon the temperature which is employed for the treatment step. After treating the adsorbent to remove a major portion of the adsorbed ammonia, the adsorbent may then be subjected to various means which are required for the recovery of the desired metal value. For example, the solid adsorbent may be subjected to an acid stripping process utilizing dilute acid such as sulfuric acid, hydrochloric acid, nitric acid, etc., whereby the metal ions are stripped from the adsorbent and thereafter the acid solution subjected to an electrowinning process for the recovery of the desired metal. Other conventional means of metal recovery will include burning the adsorbent to remove the combustible material and recover the metal value in elemental form or by subjecting the adsorbent to elution to again recover the desired metal values.

BRIEF DESCRIPTION OF THE DRAWING

The present process will be further illustrated with reference to the accompanying drawing which illustrates a simplified flow diagram of the inventive feature of the present process. Various valves, coolers, condensers, pumps, controllers, etc., have been eliminated as not being essential to the complete understanding of the present invention. The illustration of these, as well as other essential appurtenances will become obvious as the drawing is described.

Referring now to the drawing, a feedstock comprising a metal-bearing source such as an ore which has been reduced to the desired particle size by grinding, ball milling, etc., is charged through line 1 to reducing zone 2. In reducing zone 2, the source is subjected to a reductive roast at a temperature in the range of from about 500° to about 1000° C. in a reducing atmosphere which is provided for by the introduction of a reductant through line 3. In addition, the metal-bearing source is in contact with an additive which may have been added to the metal-bearing source prior to its introduction to reductive roast zone 2 or, if so desired, the reductant may be charged to zone 2 through line 4 into metal-bearing source contacted with the additive therein. After being subjected to a reductive roast for a predetermined period of time, the reduced metal-bearing source is withdrawn through line 5 and passed to a quench zone, not shown in the drawing, wherein it is cooled to the desired temperature and thereafter passed to leaching zone 6. In leaching zone 6, the reduced source is contacted with a leaching solution comprising an ammoniacal ammonium salt solution which is charged to zone 6 through line 7. In leaching zone 6, the various metal values in the metal-bearing source are converted to the corresponding soluble salts. The gangue which remains in solid form is withdrawn from leaching zone 6 through line 8 and disposed of while the solution is withdrawn through line 9 and passed to extraction zone 10. In extraction zone 10, the solution is contacted with a solvent of the type hereinbefore set forth in greater detail. Using a laterite ore as an example of the process of this invention, the nickel and copper contained in the metal-bearing source are extracted by the solvent and removed from extraction zone 10 through line 11. Cobalt which is a valence state of $+3$ is unaffected by the solvent and is not extracted, thereby remaining in the aqueous phase in the mixture. The unextracted cobalt is withdrawn through line 12 and passed to exchange zone 13. In exchange zone 13, the solution is contacted with a solid adsorbent such as lignite, coal, peat, carbon, etc., wherein the metal values such as cobalt ions are adsorbed on the solid adsorbent. The ammoniacal solution is withdrawn from exchange zone 13 through line 14 and may be recycled back to leaching zone 6. After treating for a predetermined period of time, the solid adsorbent containing the metal ions adsorbed thereon is withdrawn from exchange zone 13 through line 15 and passed to a treatment zone 16. In treatment zone 16, the lignite is treated at an elevated temperature with a stripping agent such as steam, hot water or a hot gas charged thereto through line 17. The ammonia which is removed from the solid adsorbent is withdrawn from treatment zone 16 along with the stripping agents through line 18. The treated lignite containing the adsorbed metal values is withdrawn from treatment zone 16 through line 19 and passed to a stripping zone 20 wherein said solid adsorbent may be contacted with an acid solution which is charged to stripping zone 20 through line 21. After stripping the metal values from the lignite, the acid solution containing said metal ions is withdrawn from stripping zone 20 through line 22 and subjected to conventional means necessary for the recovery of the desired metal value. The solid adsorbent which has been stripped of the metal ions is withdrawn from stripping zone 20 through line 23 and recycled back to exchange zone 13 for further contact with the solution from extraction zone 10.

The following examples are given for purposes of illustrating the process of this invention. However, it is to be understood that these examples are merely for purposes of illustration and that the present invention is not necessarily limited thereto.

EXAMPLE I

In this example, 700 ml of an ammonium carbonate solution which contained about 300 mg/liter of cobalt was passed through 5 grams of lignite in a column at ambient temperature and atmospheric pressure at a rate of approximately 1 ml/min. After passage of the solution through the column, the lignite was washed with water and 100 ml of a dilute acid solution consisting of 1% sulfuric acid was passed over the lignite. The sulfuric acid solution was then analyzed and found to contain 69 mg of cobalt which was approximately 70% of the cobalt charged to the column.

The lignite column was then washed with water and ammonium hydroxide and a second ammoniacal ammonium carbonate solution containing cobalt was passed over the lignite column under similar conditions to that set forth in the above paragraph. After passage of the ammoniacal ammonium carbonate solution over the lignite, the adsorbent was then stripped with a 1% sulfuric acid solution in a manner also similar to that hereinbefore set forth and analysis of the dilut acid solution disclosed that approximately 72% of the cobalt charged was recovered.

EXAMPLE II

To illustrate the efficiency of the present invention, the lignite column from the above experiment was washed with water and treated with steam at a temperature of 100° C. for a period of 1 hour. The steam-stripped lignite column was then stripped with a fresh solution of 1% sulfuric acid and analysis of the sulfuric acid solution disclosed the presence of 39 mg of cobalt which had remained adsorbed on the lignite column, not having been removed by the acid-stripping from the previous charge.

As in Example II above, an ammoniacal ammonium carbonate solution containing cobalt dissolved therein was again passed through the 5 gram lignite column at ambient temperatures and pressures at a rate of about 1 ml/min. After passage of the solution over the lignite, the adsorbent was again treated with steam at a temperature of 100° C. for a period of 1 hour and thereafter stripped by passage of a 100 ml dilute acid solution of 1% sulfuric acid over the column. Analysis of this acid solution disclosed the presence of 81 mg of cobalt. This 81 mg of cobalt comprised the initial charge of cobalt plus some residual cobalt which still remained adsorbed on the lignite and which had not been previously stripped therefrom.

After the last acid-stripping of the lignite with the dilute acid solution, the lignite was dissolved in a mixture of concentrated sulfuric acid and nitric acid and the resultant solution was analyzed for cobalt. It was found that about 2% of the total cobalt charged in the solution over the lignite had remained in the lignite, this amount being about 5% of the total capacity of the lignite.

EXAMPLE III

To illustrate the efficacy of the process of the present invention, a comparison was made by treating lignite which contained about 300 mg per liter of cobalt prior to subjecting the loaded lignite to a sulfuric acid stripping step. One sample of the loaded lignite was treated with water at ambient temperature for a period of 1 hour, a second sample was treated with water which was heated to a temperature of 50° C. for an hour while the third sample was treated with steam at a temperature of 100° C. for a period of 1 hour. The lignite was then washed with 100 of a dilute acid solution consisting of 1% sulfuric acid. The consumption of sulfuric acid during stripping of the cobalt lignite was then calculated, the results being set forth in Table I below.

TABLE I

| Test # | Pretreatment | Equivalents of H+ Consumed | Equivalents of Co$^{+2}$ Stripped | Fraction of H+ Used to Recover Co |
|---|---|---|---|---|
| 1 | Ambient H$_2$O 1 hr. | 0.065 | 0.009 | 0.14 |
| 2 | 50° C. H$_2$O 1 hr. | 0.045 | 0.023 | 0.51 |
| 3 | 100° C. H$_2$O 1 hr. | 0.060 | 0.039 | 0.65 |

In addition, the concentration of nitrogen in the sulfuric acid strip solution was also calculated, the results being set forth in Table II below.

TABLE II

| Test # | Pretreatment | Conc. of Nitrogen in H$_2$SO$_4$ |
|---|---|---|
| 1 | Ambient H$_2$O 1 hr. | 1.2 g/l |
| 2 | 50° C. H$_2$O 1 hr. | 0.03 g/l |
| 3 | 100° C. H$_2$O 1 hr. | 0.01 g/l |

It is therefore readily apparent from the above tables that the equivalent of cobalt which was stripped from the loaded lignite was much greater when the lignite had been treated with steam than when the lignite had been treated with water at ambient temperature/or 50° C., thus increasing the efficiency of the acid which was used in the subsequent stripping operation. Likewise, a comparison of the results set forth in Table II showed that the concentration of nitrogen in the sulfuric acid solution was of an order of 2 magnitudes less than treatment with steam than heat-treating with water at ambient temperature.

We claim as our invention:

1. In a process for the recovery of cobalt values from a cobalt-bearing source which comprises treating said source at an elevated temperature, leaching the resultant reduced source with an ammoniacial ammonium salt solution, adsorbing dissolved cobalt ions on a solid carbonaceous adsorbent and recovering the adsorbed cobalt ions, the improvement which comprises treating said solid adsorbent with a gaseous hydrogen stripping agent at an elevated temperature prior to recovery of said cobalt ions.

2. The improvement as set forth in claim 1 in which said treatment with said stripping agent is effected at a temperature in the range of from about 75° to about 150° C.

3. The process as set forth in claim 1 in which said solid carbonaceous adsorbent is carbon.

4. The process as set forth in claim 1 in which said solid carbonaceous adsorbent is peat.

5. The process as set forth in claim 1 in which said solid carbonaceous adsorbent is lignite.

6. The process as set forth in claim 1 in which said cobalt-bearing source is a laterite ore.

7. The process as set forth in claim 1 in which said additive is hydrogen chloride.

8. The process as set forth in claim 1 in which said additive is sulfur dioxide gas.

9. The process as set forth in claim 1 in which said additive is elemental sulfur.

10. The process as set forth in claim 1 in which said reductive roast is effected at a temperature in the range of from about 500° to about 1000° C.

* * * * *